US005934451A

United States Patent [19]

Yu et al.

[11] Patent Number: 5,934,451

[45] Date of Patent: Aug. 10, 1999

[54] ILLUMINATED ROCKER SWITCH COVER ASSEMBLY EMPLOYING ELECTROLUMINESCENT LAMP MEMBER

[75] Inventors: Dongxiao Yu, Commack, N.Y.; Joseph DiOrio, Providence, R.I.

[73] Assignee: Leviton Manufacturing Co., Inc., Little Neck, N.Y.

[21] Appl. No.: 09/010,209

[22] Filed: Jan. 21, 1998

[51] Int. Cl.[6] .............................. H01H 9/00; G01D 11/28

[52] U.S. Cl. .......................... 200/315; 116/286; 200/310; 362/23

[58] Field of Search .................................... 116/279–386; 200/308–317; 362/23–29

[56] References Cited

U.S. PATENT DOCUMENTS

| | | | |
|---|---|---|---|
| 3,609,268 | 9/1971 | Sanchez | 200/315 |
| 3,651,296 | 3/1972 | Yarbrough | 200/315 |
| 3,770,920 | 11/1973 | Poliak | 200/457 |
| 3,995,132 | 11/1976 | Piber | 200/315 |
| 4,436,972 | 3/1984 | Scanlon | 200/315 |
| 4,473,870 | 9/1984 | Sorenson | 200/310 X |
| 5,095,409 | 3/1992 | Dematteo et al. | 362/23 |

*Primary Examiner*—J. R. Scott
*Attorney, Agent, or Firm*—Paul J. Sutton

[57] ABSTRACT qAn illuminated rocker assembly for an electrical rocker switch which employs a lamp incorporating electroluminescent materials that luminese when subjected to AC current, are cool to the touch and have long service life. The location and amount of light available depend on the materials used and the design of the lamp envelope and rocker cover.

26 Claims, 3 Drawing Sheets

70

ILLUMINATED ROCKER SWITCH COVER ASSEMBLY EMPLOYING ELECTROLUMINESCENT LAMP MEMBER

BACKGROUND OF THE INVENTION

1. Field of the Invention

The invention is directed to illuminated rocker assemblies for use with rocker-type electrical switches and more particularly to one using a lamp employing electroluminescent material.

2. Description of the Prior Art

Prior art illuminated rocker switches most often employ incandescent lamps or a neon bulb. The neon bulb produces very little light and cannot be employed with many colors of rocker switch covers. The incandescent lamp produces more light but it also generates heat which often makes the rocker cover quite hot to the touch and also degrades the rocker cover.

SUMMARY OF THE INVENTION

The instant invention overcomes the difficulties noted above with respect to prior art devices by providing an illuminated rocker assembly which is illuminated by a lamp employing electroluminescent materials which produce a good light level and operate at a low thermal level. The electroluminescent lamp will also provide long term service. For example, the neon lamp will provide a service life of 1000 hours whereas the electroluminescent lamp will have a service life of 30,000 hours. The electroluminescent lamp is placed on a back plate which has apertures therethrough to receive the conductors of the lamp to permit its connection to a suitable AC power source. By controlling the application of such power to the lamp, the lamp can be made to light when the rocker switch is in one or the other of its two rest positions to show the system is on or off. The lamp and the back plate are covered with a suitable rocker cover which is sealed about its edges to the back plate to prevent the entrance of any foreign materials. The rocker cover or the lamp or both can be made fully or partially transparent, translucent, opaque or colored as desired. It is an object of the instant invention to provide an illuminated rocker assembly.

It is an object of the instant invention to provide an illuminated rocker assembly which employs a lamp which provides light by means of electroluminescence.

It is still another object of the instant invention to provide an illuminated rocker assembly which has a long service light and is cool to the touch.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWINGS

In the drawings in which similar elements are given similar reference characters.

DESCRIPTION OF THE PREFERRED EMBODIMENT

Figure 1:
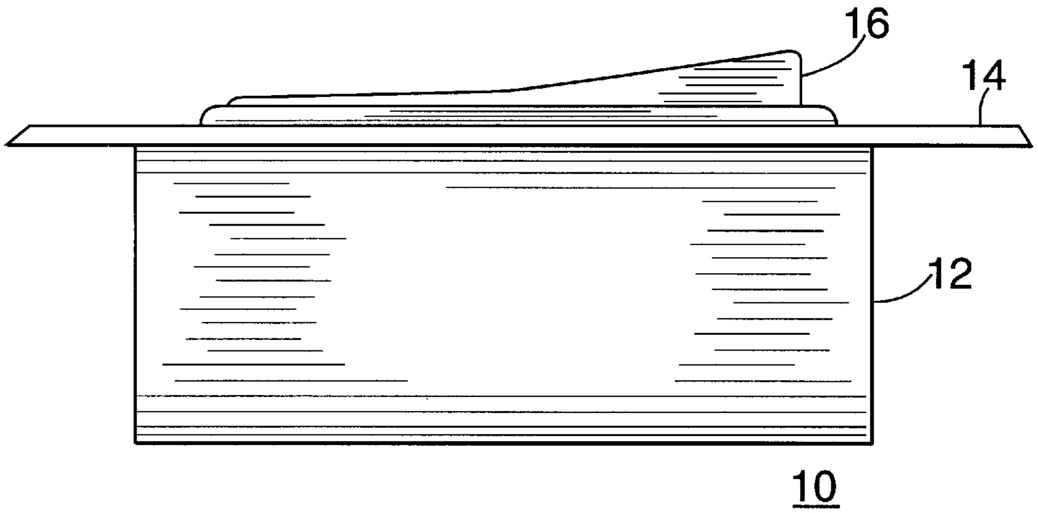
FIG. 1 is a side elevational view of a rocker-type electrical switch.
Figure 2:
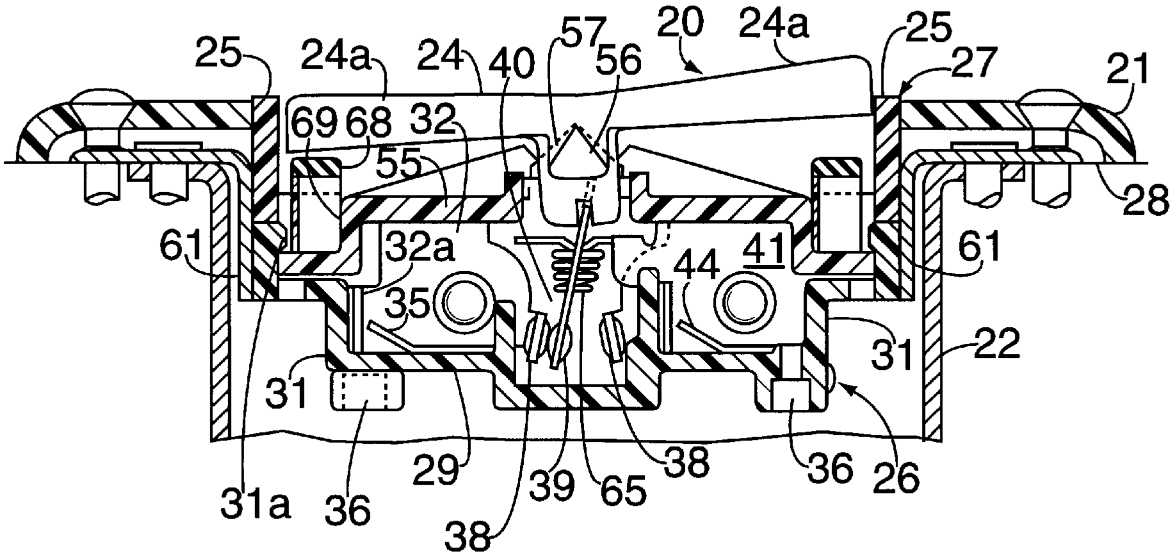
FIG. 2 PRIOR ART
FIG. 2 is a fragmentary side elevational view, partly in section, of a complete rocker-type switch known in the prior art and is FIG. 2 of U.S. Pat. No. 3,770,920 issued Nov. 6, 1973 and now expired.

FIG. 1 shows a rocker-type switch 10 having a body portion 12 over which a face plate 14 is placed with the rocker 16 protruding above the surface of face plate 14. As seen in FIG. 2 rocker switch 20 has a pivotal rocker 24 which also includes an upwardly facing V-shaped trunnion 56 on each side (only one of which is visible in the figure) which mates with the apex of a triangular shaped aperture in the side wall 30 (not shown) about which it pivots. The position of rocker 24 is controlled by coil spring 65 on pivotal brush 40 which also includes movable contact buttons 39 connected to an electrical conductor at a terminal (not shown). Fixed contact buttons 38, also connected to electrical conductors at individual terminals 35, 44 are engaged by movable contact buttons 39 to complete one or other of the circuits connected to fixed contact buttons 38.

Figure 3:
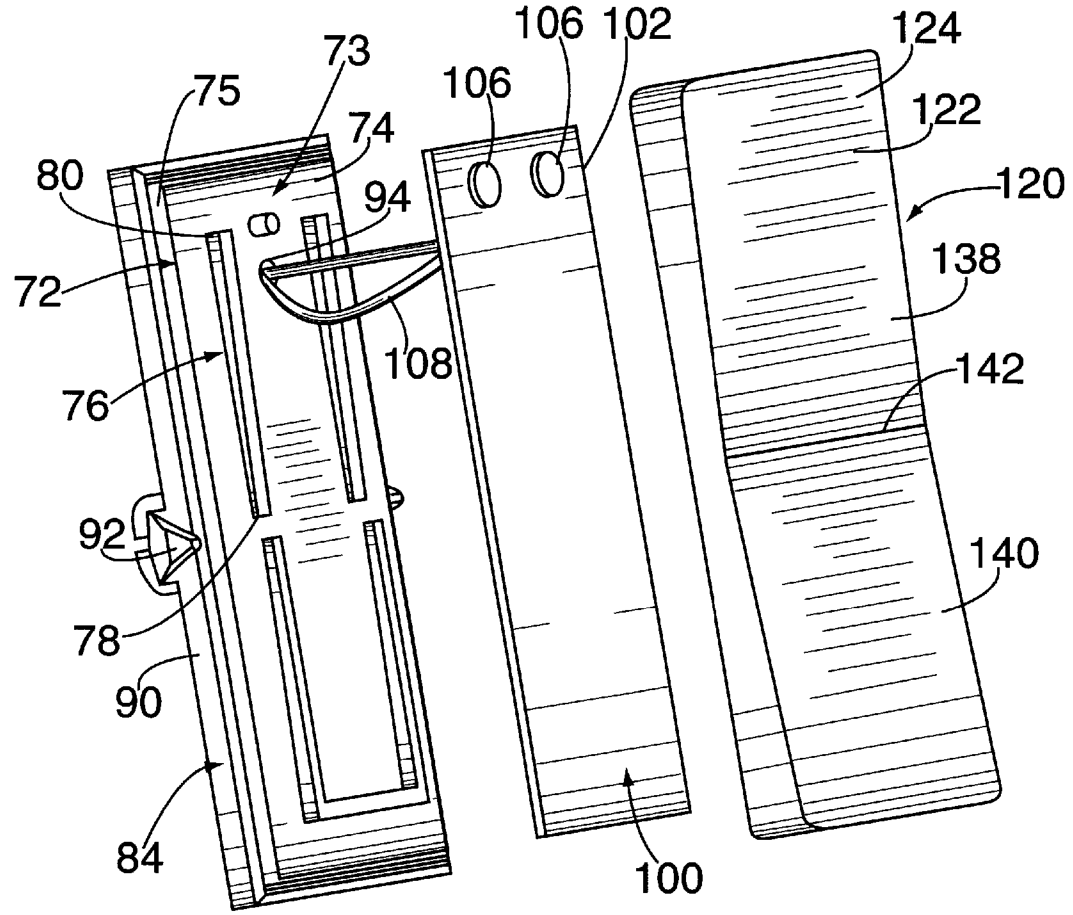
FIG. 3 is an exploded, front perspective view of an illuminated rocker assembly constructed in accordance with the concepts of the invention.
Figure 5:
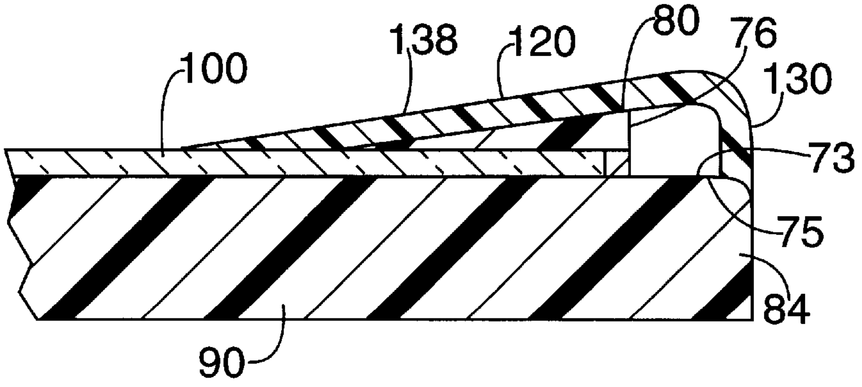
FIG. 5 is a fragmentary, side elevational view, in section, of the components of FIG. 3 fully assembled.
Figure 4:
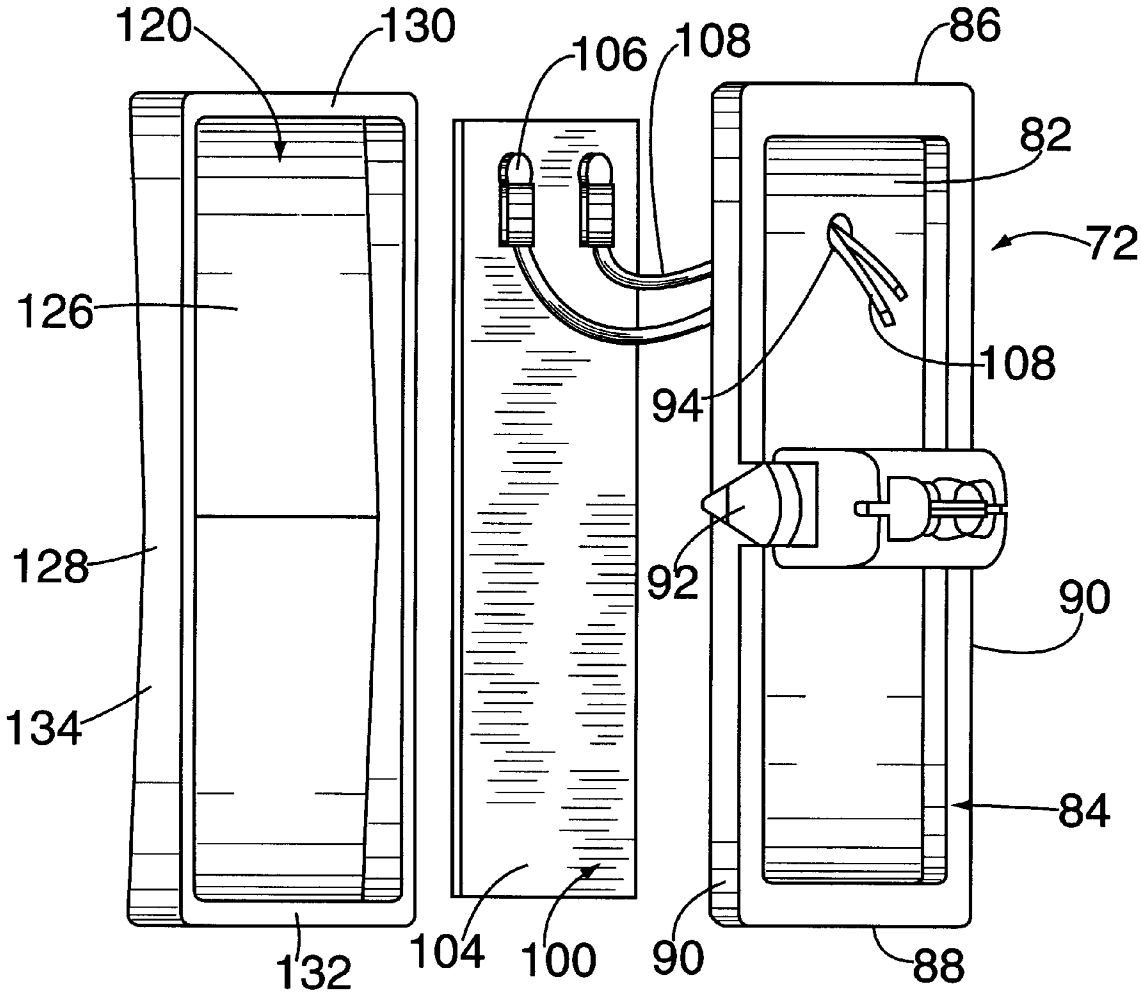
FIG. 4 is an exploded, rear perspective view of the device of FIG. 3.

Turning now to FIGS. 3, 4 and 5 there is shown an illuminated rocker assembly 70 constructed in accordance with the concepts of the invention. Illuminated rocker assembly 70 comprises a back plate 72 having a body 73 having a front or first surface 74 and a rear or second surface 82. A skirt 84 composed of a top wall 86, a bottom wall 88 and two parallel spaced apart side walls 90, extends downwardly from and perpendicular to said second surface 82. The skirt 84 extends outwardly from the body 73 to provide a step 75. A pair of upwardly facing V-shaped trunnions 92, one on each of the side walls 90, will engage the apices of suitable apertures in the side walls of the switch body (not shown) and operate generally as described in the above cited U.S. Pat. No. 3,770,920. Formed on first surface 74 are a series of ramp supports 76 each extending from a first height at end 78 to a greater height at end 80. The ramp supports 76 are configured to match the inclined panels of the rocker cover as will be described below. An aperture 94 extends through the back plate 72 from first surface 74 to second surface 82.

An elongate, flat lamp 100 having a front face 102 and a rear face 104 is positioned on back plate 72 with rear face 104 of lamp 100 engaging the first surface 74 of back plate 72. Two conductors 108 extend from terminals 106 on lamp 100 through the aperture 94 in back plate 72 to a source of AC power (not shown). The lamp 100 can be placed in series with one of fixed contact buttons 38 of a switch such as shown in the ’920 patent so that when contact buttons 38 and 39 are engaged the lamp 100 is lit to show that the switch is on or off or that circuit 1 or circuit 2 are closed etc. The lamp 100 could be an incandescent bulb but such a bulb has a relatively short life in the nature of a few hundred hours and gives off undesirable heat. A neon bulb could be used but it gives off a low light level which may not be useful, particularly if the rocker cover must be colored. Its service life of about 1000 hours makes it preferable to the incandescent bulb where it can be used.

The preferred bulb to be used for lamp 100 is an electroluminescent bulb which contains electroluminescent materials which when subjected to AC current emit visible or infra-red light. Such materials can be zinc sulfide and may be combined with copper and/or magnesium. One source of such zinc sulfide electroluminescent materials is Osram Sylvania. These materials may emit red, green, yellow, blue or orange colored light based upon the particular material employed. Bulb 100 produces little heat and has a service life of about 30,000 hours. The bulb 100 is placed between the ramp supports 76 with conductors 108 passing through aperture 94 in back plate 72.

The lamp 100 may have an envelope which is fully transparent or where only front face 102 is transparent. Also, only a portion of the front face 102 is transparent so that only a portion of the rocker assembly 70 is illuminated. The lamp 100 envelope could also be fully translucent or portions of it translucent in the same manner as described above with respect to transparent materials.

Over the back plate 72 and the lamp 100 is placed the rocker cover 120 made up of a front wall 122 having an outer surface 124 and an inner surface 126 surrounded by a skirt 128 made up of a top wall 130, a bottom wall 132 and two generally parallel side walls 134 joined so as to form a five sided enclosure with an open rear wall. The free edge of skirt 128 overlies the step 75 of the back plate 72 and is sealed thereto as by ultrasonic welding, adhesives, bonding agents etc. to form a hermetic seal for the entire illuminated rocker assembly 70. The front wall 122 is made up of two downwardly inclined panels 138 and 140 which meet at a common edge 142. The panels 138, 140 have the same pitch as the ramp supports 76 and the inner surface 126 of front wall 122 rests on the ramp supports 76, two ramp supports 76 for each of the panels 138, 140. This provides support and reinforcement for the panels 138, 140.

The entire rocker cover 120 can be fabricated from transparent or translucent materials or selected portions can be made of one of these materials while the remainder is made of the other to control the amount and location of the illumination. The rocker cover 120 can also be opaque and any of these covers 120 can be tinted or colored.

While there have been shown and described and pointed out the fundamental novel features of the invention are applied to the preferred embodiment, as is presently contemplated for carrying them out, it will be understood that various omissions and substitutions and changes of the form and details of the devices illustrated and in their operation may be made by those skilled in the art, without departing from the spirit of the invention.

We claim:

1. An illuminated rocker assembly for a rocker switch comprising:

a) a back plate having a first surface and a second surface;

b) a flat, elongate lamp member having a front face and a rear face, positioned on said back plate with said rear face of said lamp member engaging said first surface of said back plate; and c) a rocker cover having a front wall, a top wall, a bottom wall and two spaced apart, generally parallel side walls, said front wall, said top wall, said bottom wall and said two side walls joined to form an enclosure with an open rear wall, said rocker cover positioned over said back plate with the free ends of said top wall, said bottom wall and said two side walls joined to said back plate to provide a back wall for said rocker cover and close said enclosure.

2. An illuminated rocker assembly as defined in claim 1, wherein said lamp member has two electrical conductors extending from said rear face; and said back plate has an aperture therethrough from said first surface to said rear surface to permit said two electrical conductors to pass through said back plate for connection to a source of AC power to light said lamp member.

3. An illuminated rocker assembly as defined in claim 1, wherein said lamp member contains a filament which emits light when connected to an AC power source.

4. An illuminated rocker assembly as defined in claim 2, wherein said lamp member contains a filament which emits light when connected to an AC power source.

5. An illuminated rocker assembly as defined in claim 1, wherein said lamp member contains an electroluminescent material which emits visible light when connected to a source of AC power.

6. An illuminated rocker assembly as defined in claim 2, wherein said lamp member contains an electroluminescent material which emits visible light when connected to a source of AC power.

7. An illuminated rocker assembly as defined in claim 5, wherein said electroluminescent material is zinc sulfide.

8. An illuminated rocker assembly as defined in claim 6, wherein said electroluminescent material is zinc sulfide.

9. An illuminated rocker assembly as defined in claim 1, wherein said lamp member front face is transparent.

10. An illuminated rocker assembly as defined in claim 1, wherein at least a portion of said lamp member front face is transparent.

11. An illuminated rocker assembly as defined in claim 1, wherein said lamp member front face is translucent.

12. An illuminated rocker assembly as defined in claim 1, wherein at least a portion of said lamp member front face is translucent.

13. An illuminated rocker assembly as defined in claim 9, wherein said front wall of said rocker cover is transparent.

14. An illuminated rocker assembly as defined in claim 10, wherein said front wall of said rocker cover is transparent.

15. An illuminated rocker assembly as defined in claim 10, wherein at least a portion of said front wall of said rocker cover is transparent and said transparent portion of said rocker cover overlies said transparent portion of said lamp member.

16. An illuminated rocker assembly as defined in claim 11, wherein said front wall of said rocker cover is transparent.

17. An illuminated rocker assembly as defined in claim 12, wherein at least a portion of said rocker cover is transparent.

18. An illuminated rocker assembly as defined in claim 12, wherein said at least a portion of said front wall of said rocker cover is transparent and said transparent portion of said rocker cover overlies said transparent portion of said lamp member.

19. An illuminated rocker assembly as defined in claim 19, wherein said front wall of said rocker cover is translucent.

20. An illuminated rocker assembly as defined in claim 10, wherein said front wall of said rocker cover is translucent.

21. An illuminated rocker assembly as defined in claim 10, wherein at least a portion of said front wall of said rocker cover is translucent.

22. An illuminated rocker assembly as defined in claim 12, wherein at least a portion of said front wall of said rocker cover is translucent and said translucent portion of said rocker cover overlies said translucent portion of said lamp member.

23. An illuminated rocker assembly as defined in claim 9, wherein said front wall of said rocker cover is opaque.

24. An illuminated rocker assembly as defined in claim 10, wherein at least a portion of said front wall of said rocker cover is opaque.

25. An illuminated rocker assembly as defined in claim 23, wherein said front wall of said rocker cover is colored.

26. An illuminated rocker assembly as defined in claim 24, wherein said at least a portion of said front wall of said rocker cover is colored.

* * * * *